(12) United States Patent
Stahura

(10) Patent No.: US 7,359,987 B2
(45) Date of Patent: Apr. 15, 2008

(54) METHOD AND SYSTEM FOR PROVIDING STATIC ADDRESSES FOR INTERNET CONNECTED DEVICES EVEN IF THE UNDERLYING ADDRESS IS DYNAMIC

(75) Inventor: Paul Stahura, Sammamish, WA (US)

(73) Assignee: eNom, Inc., Bellevue, WA (US)

( * ) Notice: Subject to any disclaimer, the term of this patent is extended or adjusted under 35 U.S.C. 154(b) by 568 days.

(21) Appl. No.: 09/899,829

(22) Filed: Jul. 5, 2001

(65) Prior Publication Data

US 2003/0009592 A1    Jan. 9, 2003

(51) Int. Cl.
*G06F 15/16* (2006.01)
(52) U.S. Cl. .............. 709/245; 709/203; 709/218; 709/223; 709/228; 707/2; 707/3; 707/6; 707/10
(58) Field of Classification Search ........... 709/245, 709/218, 223–226; 707/2, 3, 6, 10
See application file for complete search history.

(56) References Cited

U.S. PATENT DOCUMENTS

| | | | | |
|---|---|---|---|---|
| 5,828,839 A | * | 10/1998 | Moncreiff | 709/204 |
| 5,898,780 A | * | 4/1999 | Liu et al. | 713/155 |
| 5,974,453 A | * | 10/1999 | Andersen et al. | 709/220 |
| 5,978,568 A | | 11/1999 | Abraham et al. | |
| 6,016,512 A | * | 1/2000 | Huitema | 709/245 |
| 6,026,441 A | * | 2/2000 | Ronen | 709/227 |
| 6,104,711 A | * | 8/2000 | Voit | 370/352 |
| 6,178,455 B1 | | 1/2001 | Schutte et al. | |
| 6,195,691 B1 | | 2/2001 | Brown | |
| 6,205,489 B1 | * | 3/2001 | Kapoor | 709/245 |
| 6,243,749 B1 | * | 6/2001 | Sitaraman et al. | 709/223 |
| 6,256,671 B1 | * | 7/2001 | Strentzsch et al. | 709/227 |
| 6,286,039 B1 | | 9/2001 | Van Horne et al. | |
| 6,324,585 B1 | * | 11/2001 | Zhang et al. | 709/245 |
| 6,393,467 B1 | | 5/2002 | Potvin | |
| 6,405,252 B1 | | 6/2002 | Gupta et al. | |
| 6,412,014 B1 | * | 6/2002 | Ryan | 709/245 |

(Continued)

FOREIGN PATENT DOCUMENTS

WO    WO-99/37073    7/1999

OTHER PUBLICATIONS

Kim Fryer, Microsoft Computer Dictionary 1997, Microsoft Press, 3$^{rd}$ edition, p. 505.*

(Continued)

*Primary Examiner*—Bunjob Jaroenchonwanit
*Assistant Examiner*—Duyen M Doan
(74) *Attorney, Agent, or Firm*—Perkins Coie LLP

(57) ABSTRACT

A method and system for resolving domain names of web sites with dynamic addresses. The resolution system, which may execute as part of a domain name server, receives a domain name associated with a web site. The resolution system then identifies a dynamic address name associated with the received domain name. The resolution system then sends to a dynamic address system the identified dynamic address name. The dynamic address system then returns an address associated with the dynamic address name to the resolution system. Upon receiving the identified address, the resolution system then returns the identified address as the address of the received domain name. Methods and systems for mapping an unregistered domain name to an address and for placing telephone calls via a network are also provided.

30 Claims, 12 Drawing Sheets

U.S. PATENT DOCUMENTS

| | | | |
|---|---|---|---|
| 6,434,600 B2* | 8/2002 | Waite et al. | 709/206 |
| 6,539,077 B1* | 3/2003 | Ranalli et al. | 379/67.1 |
| 6,587,876 B1* | 7/2003 | Mahon et al. | 709/223 |
| 6,614,780 B2* | 9/2003 | Hakim et al. | 370/352 |
| 6,628,647 B1* | 9/2003 | Chua et al. | 370/356 |
| 6,643,685 B1* | 11/2003 | Millard | 709/206 |
| 6,677,976 B2* | 1/2004 | Parker et al. | 348/14.08 |
| 6,718,030 B1* | 4/2004 | Turner et al. | 379/221.02 |
| 6,788,769 B1* | 9/2004 | Waites | 379/93.24 |
| 6,973,488 B1* | 12/2005 | Yavatkar et al. | 709/223 |
| 7,171,473 B1* | 1/2007 | Eftis et al. | 709/227 |
| 7,188,175 B1* | 3/2007 | McKeeth | 709/227 |
| 2001/0023447 A1* | 9/2001 | West et al. | 709/230 |
| 2002/0013823 A1* | 1/2002 | Eubanks | 709/217 |
| 2002/0016174 A1* | 2/2002 | Gibson et al. | 455/464 |

OTHER PUBLICATIONS

Calore, Michael, "webmonkey/backend/DHCP Primer," Wired Digital Inc., 1994-2005, 5 pages http://www.hotwired.com/webmonkey/templates/print_template.htmlt?meta=/webmonkey/00/39/index3... [accessed Dec. 20, 2005].

International Search Report for PCT/US02/21169 dated Sep. 17, 2002.

* cited by examiner

METHOD AND SYSTEM FOR PROVIDING STATIC ADDRESSES FOR INTERNET CONNECTED DEVICES EVEN IF THE UNDERLYING ADDRESS IS DYNAMIC

TECHNICAL FIELD

The described technology relates generally to resolving addresses for Internet connected devices and particularly to providing dynamic addresses for Internet connected devices.

BACKGROUND

The Internet provides a domain name system ("DNS") that maps domain names to Internet protocol addresses ("IP addresses") associated with the domain names. A user who wants to view a web page associated with a domain name may enter the domain name (e.g., "acme.com") in the address line of a browser. Additionally, programs other than browsers may use domain names to identify computers that provide services other than serving web pages. Since the servers of the Internet are addressed by IP addresses, rather than domain names, the browser (or other client program) needs to convert the domain name to an IP address (e.g., 209.19.43.100). The browser submits a resolution request that specifies the domain name to a local domain name server (e.g., provided by an ISP) that is part of the DNS. The local domain name server may be identified in a configuration file of the client computer executing the browser. The local domain name server checks a local cache to determine whether it has a mapping of that domain name to IP address. If so, it returns the IP address to the browser. If not, it forwards the resolution request to a root domain name server. The root domain name server contains a mapping of each top-level domain name (e.g., "com") to its name server(s). The root domain name server responds to the resolution request by providing the name of the top-level domain name server to the local domain name server. The local domain name server caches the name of the top-level domain name server. The local domain name server then sends the resolution request to the top-level domain name server and receives (and may cache) the name of the domain name server for the second-level domain name (e.g., "acme.com"). The local domain name server forwards the resolution request to the domain name server for the second-level domain name. The domain name server returns the IP address associated with the second-level domain name. Alternatively, it may return the name of the domain name server for the third-level domain name (e.g., "www.acme.com"), and the local domain name server may repeat the process for each level of domain name. Eventually, the local domain name server sends the IP address of the domain name to the client computer. The browser executing at the client computer then sends an HTTP request message with a uniform resource identifier that includes the domain name to that IP address.

If a domain name is not registered with the DNS, then the domain name server may return a not registered indication to the browser, which may display an error message. Alternatively, the domain name server may, but not typically, return an IP address of a web site, for example, through which that domain name can be registered.

To facilitate communications between Internet users, some companies provide an instant messaging service through which two users can send messages directly to each other without having to use an intermediate server to coordinate sending the messages. (Some instant messaging services do use an intermediate server to provide benefits not available when messages are sent directly between users.) To use such an instant messaging service, a user needs to register with an instant messaging system by providing a user name (e.g., electronic mail address or some other identifier) and password. Once a user is registered, the user can then sign onto or connect to the instant messaging system and send messages to and receive messages from other users who are also signed onto the instant messaging system. When a user signs onto the instant messaging system, the instant messaging system records the IP address associated with the user's computer. Some users' computers may have static IP addresses, while other users' computers may have dynamic IP addresses that are assigned each time a user initiates an Internet session. During the signon process, the instant messaging system generates a mapping between the user name and their current IP address. When a user wants to send a message, the sending user sends a request to the instant messaging system to provide the current IP address for a user name to which a message is to be sent. The instant messaging system looks up the IP address for that user name and provides the IP address to the sending user. The sending user then sends the message directly to that IP address. In other instant messaging services, the message is sent to the instant messaging system, which forwards the message to the recipient user. In either case, the instant messaging system keeps track of the current IP address of all users currently signed onto the instant messaging system.

Telephone calls can also be conducted over the Internet. For example, a user may download a telephone plug-in for their browser or a user may browse to a Java-enabled web site that automatically downloads telephone software. A user can use a telephone plug-in to enter a telephone number in a field of a web page. The plug-in then sends a message to a telephone server to place a call via the plain old telephone system ("pots") to the entered telephone number. When the call has been established, the telephone server and the telephone plug-in coordinate the sending of the voice information from the caller over the Internet to the telephone server and onto the callee and back from the callee to the telephone server and then to the plug-in over the Internet. The plug-in is responsible for digitizing the voice information of the caller so it can be transmitted via the Internet to the telephone server and for generating the audio associated with the digitized voice information received via the Internet from the telephone server. The use of telephone over the Internet has the potential to reduce long distance charges associated with telephone calls because the telephone servers may be positioned at various locales. A request to place a telephone call may be routed to the appropriate telephone server so that only local calls need be placed.

It would be desirable to have a technique that would allow domain name servers to support server, computer, and other devices whose IP addresses are dynamically assigned, rather than just statically assigned. It would also be desirable to have a technique that would allow for a more user-friendly way to dial a telephone number via the Internet. Finally, it would be desirable to have a technique that would provide more useful information when a user enters an unregistered domain name.

DETAILED DESCRIPTION

Figure 1:
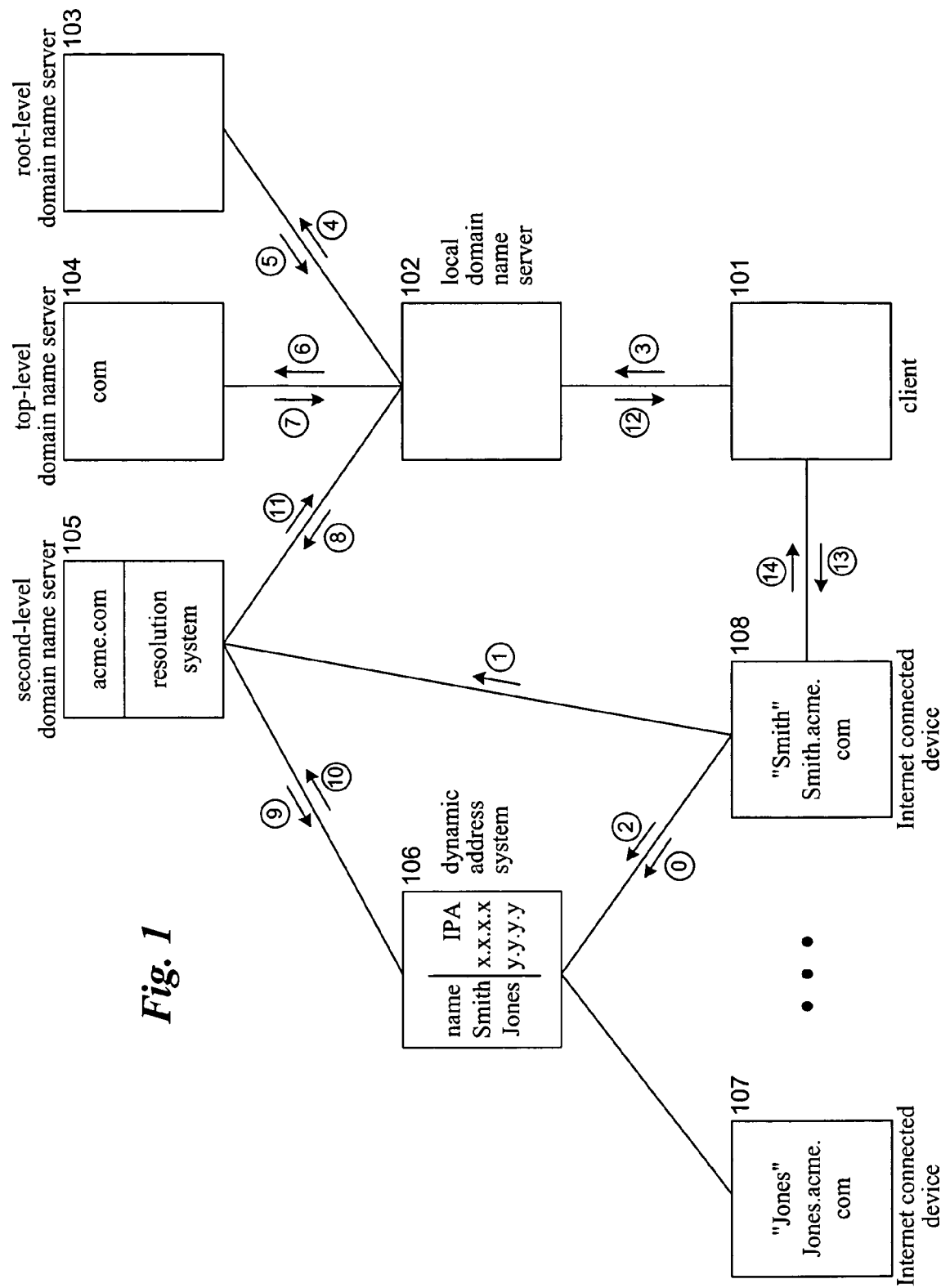
FIG. 1 is a block diagram of an example flow of information of the resolution system.

A method and system for resolving domain names of network connected devices with dynamic addresses is provided. In one embodiment, the resolution system, which may execute as part of a domain name server, receives (e.g., from a browser via a local domain name server) a domain name associated with a network connected device (e.g., "smith.acme.com"). The resolution system then identifies a dynamic address name (e.g., "John Smith") associated with the received domain name. The resolution system may have a mapping from domain names to dynamic address names (e.g., derived from registration of the domain address names with the resolution system). The resolution system then sends to a dynamic address system the identified dynamic address name. The dynamic address system has a mapping from dynamic address names to addresses (e.g., derived from sign on of the network connected devices with the dynamic address system). The dynamic address system allows network connected devices to register their dynamic addresses by providing their dynamic address names and their current addresses each time they sign on to the dynamic address system. Upon receiving a dynamic address name from the resolution system, the dynamic address system uses its mapping to identify the address associated with that dynamic address name. The dynamic address system then forwards the identified address to the resolution system. Upon receiving the identified address, the resolution system then returns (e.g., to a browser) the identified address as the address of the received domain name. In one embodiment, the resolution system may be part of a top-level domain name server, a second-level domain name server, or other level domain name server. When the resolution system returns the identified address, it may indicate that the local domain name server should not cache the mapping from domain name to the identified address. In this way, every resolution request will return the current address for that domain name as indicated by the dynamic address system, rather than returning a cached address. The dynamic address system may be a conventional instant messaging type system in which the resolution system and the network connected devices are signed-on users of the instant messaging system. The dynamic address names are authentication parameters, such as user names of the instant messaging system. In this way, Internet connected devices with dynamic IP addresses can be fully supported by the DNS without the signed-on computers having additional software to inform the DNS of their dynamic IP address. These signed-on computers can use their existing instant messaging system client software to indirectly notify the resolution system of the DNS of their addresses via the instant messaging system.

In an alternate embodiment, the resolution system may support mapping to addresses based on parameters associated with a uniform resource identifier. For example, a uniform resource identifier may be specified as a domain name with a top-level and second-level domain name followed by a parameter (e.g., "acme.com/smith") that identifies a resource (e.g., web site) within the second-level domain name. Since only the domain name, and not the parameter, is forwarded to a domain name server, a resolution system that executes on a domain name server may not be able to process such parameters directly. The resolution system may instead redirect the software (e.g., browser) that sent the resolution request to access a resource of a special-purpose resolution server. Upon receiving the request to access a resource, the special-purpose resolution server identifies the current address of the resource (e.g., Smith web site) by accessing the dynamic address system and directs the software to access the resource directly using the current address.

A method and system for placing telephone calls via a network (e.g., the Internet) is also provided. In one embodiment, the telephone system, which may be executing on a domain name server, receives a domain name from a client computer (e.g., via a browser). The domain name is associated with a telephone number. For example, the domain name may be "2065551212.cc" or may be "2065551212.Acme.cc." When the telephone system receives the domain name, it identifies an associated telephone number. The telephone system then identifies an address of a telephone server associated with the identified telephone number. The telephone system then sends the identified address to the client computer (e.g., its browser). When the client computer sends a request to the identified address, the telephone server places a telephone call to the identified telephone number via a plain old telephone system. When the telephone is answered, the telephone server and the client computer coordinate to conduct a telephone conversation between a user of the client computer and the person called. In one embodiment, the telephone system identifies a telephone server such that the telephone call will be placed as a local call. The client computer may have a telephone plug-in that helps coordinate of the conducting of the telephone call. The telephone number may be indirectly identified by the domain name, rather than directly included in the domain name. For example, domain name may be "johnsmith.acme.cc." In such a case, the telephone system may maintain a mapping of names to telephone numbers and would map "johnsmith" to a corresponding telephone number. The telephone number may also be identified by a parameter within the uniform resource identifier that contains a domain name. In such case, the telephone system may redirect the resolution of the domain name to a server in a similar way as may be done with the resolution system as described above. When a domain name is associated with the telephone number, then the domain name may be selected by user (e.g., as a link on a web page or in an electronic mail message) to place a telephone call.

The resolution system and telephone system both map domain names to an intermediate identifier and then map the intermediate identifier to the corresponding address. The resolution system maps a domain name to a dynamic address name, which is an intermediate identifier, and the telephone system maps a domain name to a telephone number, which is an intermediate identifier. This indirect mapping of a domain name to address (e.g., IP address) allows for much greater flexibility in resolving domain names to the corresponding addresses than is provided by the current DNS.

A method and system for mapping an unregistered domain name to an address is also provided. In one embodiment, the mapping system, which may execute on a domain name server, receives a domain name from a client computer. The mapping system determines whether the domain name is registered (i.e., has an associated address). If the domain name is not registered, then the mapping system directs a search engine that may use natural language processing techniques (e.g., meaning-based analysis) or other search engine to perform a search based on the received domain name. For example, if the domain name is "acme.com," then the search may be for web pages with the term "acme" or for web sites that are stores that sell products similar to those sold by "acme.com." The mapping system then provides the client computer with an address of a site for displaying the search results along with an indication that the domain name is not registered or otherwise does not have an associated address. If the search results contain links to web pages related to "acme," then the user of the client computer may only need to select one of the links to get to the web page of interest. The mapping system is particularly useful in situations where a user misspells a domain name (e.g., "homegrocery.com" rather than "homegrocer.com"). The search results may likely include a link to the intended web site. In an alternative embodiment, the mapping system may be implemented as part of a browser or a plug-in for a browser. In such embodiment, the mapping system would identify when the DNS returns an indication that a domain name is unregistered. The mapping system then automatically sends a search request based on the domain name to a search engine and displays the search results web page to the user. Alternatively, the mapping system could display any resulting page such as a page with advertisements selected based on the domain name.

Resolution System

FIGS. 1-6 illustrate the processing of the resolution system in one embodiment. FIG. 1 is a block diagram of an example flow of information of the resolution system. The diagram illustrates the client computer 101, a local domain name server 102, a root-level domain name server 103, a top-level domain name server 104, a second-level domain name server 105, a dynamic address system 106, and Internet connected devices 107 and 108. Initially, each Internet connected device 107 and 108 is registered with the dynamic address system by providing their dynamic address name (e.g., "Smith") as indicated by arrow 0. The Internet connected device is then registered with the resolution system by providing a mapping of its domain name to the dynamic address name as indicated by arrow 1. Internet connected device 108 signs on with the dynamic address system as indicated by arrow 2 to register its current IP address for its dynamic address name of "Smith." The dynamic address system then updates its mapping for "Smith." The client computer then submits a resolution request to a local domain name server 102 as indicated by arrow 3 for the domain name of "smith.acme.com." The local domain name server 102 forwards the resolution request to the root-level domain name server 103 as indicated by arrow 4. The root-level domain name server 103 identifies the top-level domain name server 104 and returns its name to the local domain name server as indicated by arrow 5. The local domain name server 102 then forwards the resolution request to the top-level domain name server 104 as indicated by arrow 6. The top-level domain name server 104 identifies the second-level domain name server and returns its name to the local domain name server 102 as indicated by arrow 7. The local domain name server 102 then forwards the resolution request to the second-level domain name server 105 as indicated by arrow 8. The second-level domain name server 105 then requests the dynamic address system 106 to provide the current IP address for the dynamic address name of "Smith" as indicated by arrow 9. The second-level domain name server may provide authentication information to the dynamic address system. The dynamic address system checks its map to identify the current IP address for the dynamic address name of "Smith" and returns the current IP address to the second-level domain name server 105 as indicated by arrow 10. The second-level domain name server 105 then forwards the current IP address to the local domain name server 102 as indicated by arrow 11. The second-level domain name server 105 may indicate that the IP address is not to be cached or cached for only a certain period. The local domain name server 102 forwards the IP address to the client computer 101 as indicated by arrow 12. The client computer then uses the current IP address to send a request for a resource to Internet connected device 108 as indicated by arrow 13. Internet connected device 108 then returns the web page to the client computer 101 as indicated by arrow 14. The client computer 101 then processes the resource (e.g., displays the web page).

Figure 2:
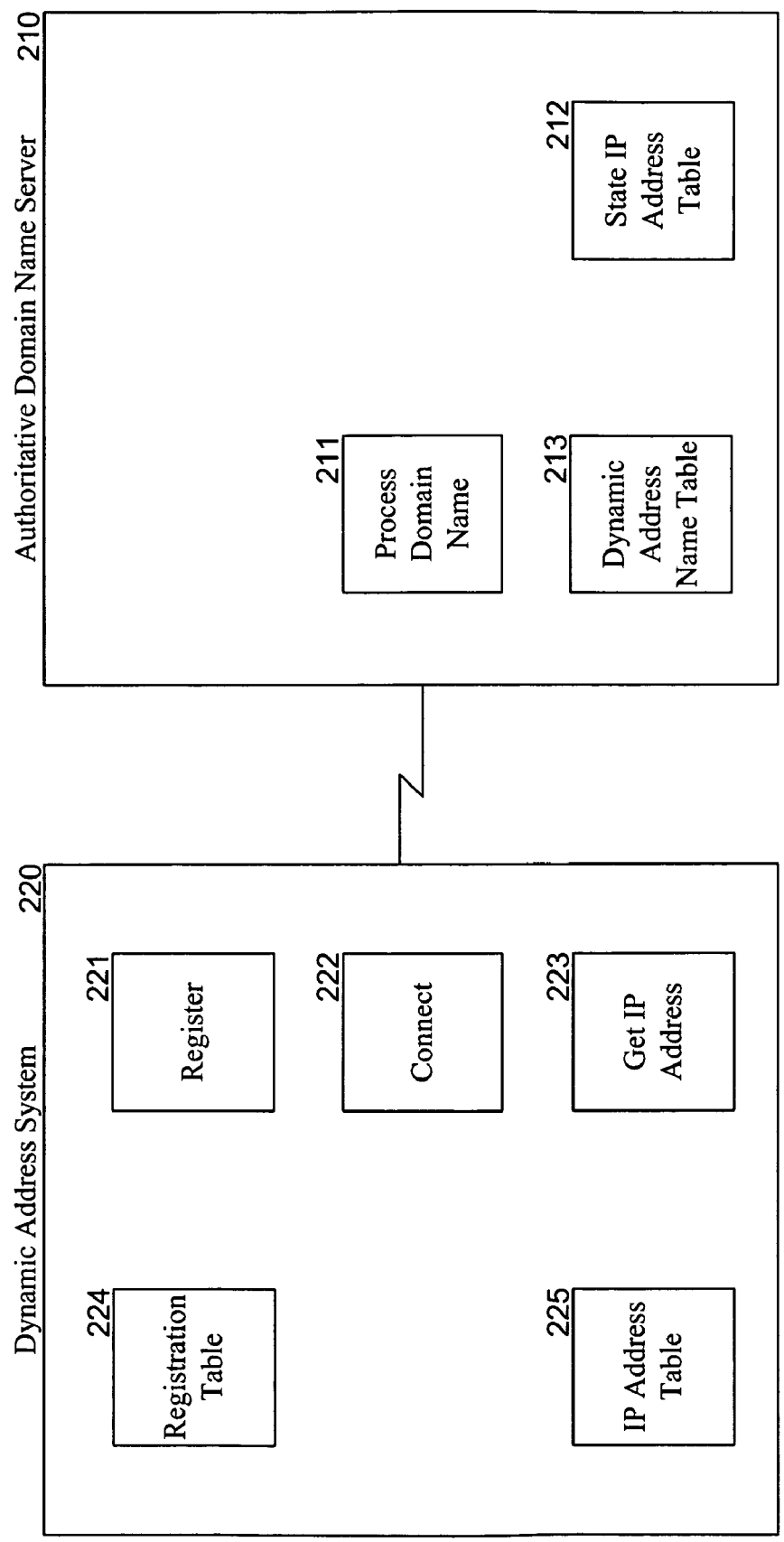
FIG. 2 is a block diagram illustrating components of the resolution system in one embodiment.

FIG. 2 is a block diagram illustrating components of the resolution system in one embodiment. The resolution system may include components executing on an authoritative domain name server 210 that interact with components of the dynamic address system 220. The domain name server includes a process domain name component 211, a static IP address table 212, and a dynamic address name table 213. The process domain name component determines whether the domain name is contained in the static IP address table. If so, it retrieves the static IP address from that table and returns it. Otherwise, the process domain name component looks up at the dynamic address name associated with the domain name in the dynamic address name table 213. The process domain name component then interacts with the dynamic address system to retrieve the current IP address associated with that dynamic address name. The component then returns that current IP address to the local domain name server for forwarding to the client computer. The dynamic address system includes a register component 221, a connect component 222, a get IP address component 223, a registration table 224, and an IP address table 225. The register component is used to register Internet connected devices with the dynamic address system. The register component adds the dynamic address name for that Internet connected device to the registration table. The connect component allows an Internet connected device to sign onto or connect to the dynamic address system. The connect component stores a mapping from the dynamic address name to the current IP address for the Internet connected device. The get IP address component receives a dynamic address name and returns the current IP address associated with that dynamic address name as indicated by the IP address table. In the case where the dynamic address system is an instant messaging system, the authoritative domain name server registers as a user of the instant messaging system and signs on to the instant messaging system so that it can invoke the IP address component to retrieve the current IP address for Internet connected devices that are currently signed onto the instant messaging system.

Figure 3:
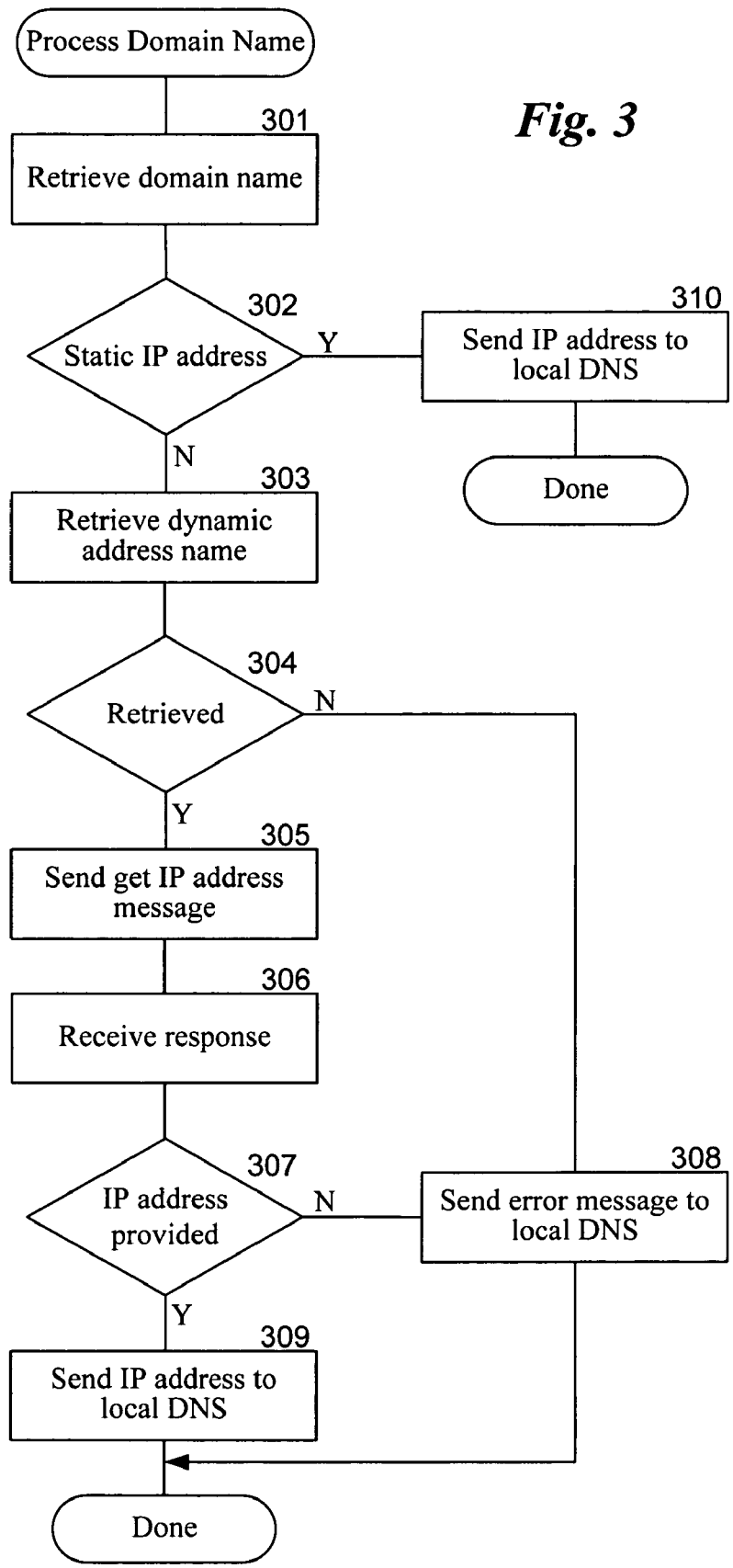
FIG. 3 is a flow diagram illustrating the processing of the process third-level domain name component in one embodiment.

FIG. 3 is a flow diagram illustrating the processing of the process domain name component in one embodiment. This component receives a domain name and returns its static IP address or dynamic IP address. In block 301, the component retrieves the domain name. In decision block 302, if the static IP address table contains a static IP address for the retrieved domain name (or uses another method to determine that the domain name is not associated with a dynamic address name), then the component sends the static IP address to the local domain name server in block 310 and then completes, else the component continues at block 303. In block 303, the component retrieves the dynamic address name for the domain name from the dynamic address name table. In decision block 304, if the dynamic address name is retrieved, then the component continues at block 305, else the component sends an error message or a message indicating that the IP address was not found to the local domain name server in block 308 and then completes. In block 305, the component sends a get IP address message to the dynamic address system. In block 306, the component receives the response from the dynamic address system. In decision block 307, if a dynamic IP address is provided in the response, then the component sends the dynamic IP address to the local domain name server in block 309 and completes, else the component sends an error message or a message indicating that the IP address was not found to the local domain name server in block 308 and then completes.

Figure 4:
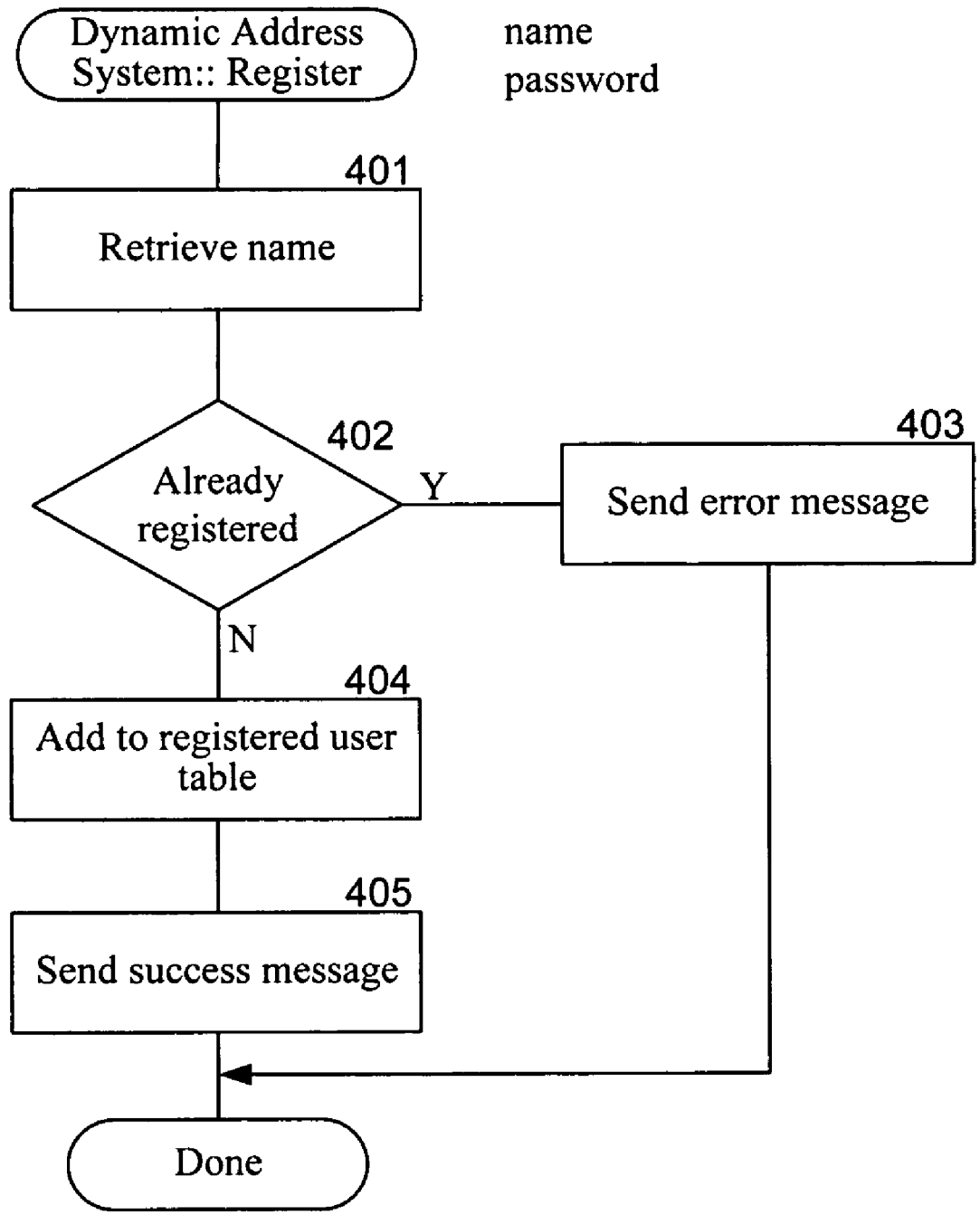
FIG. 4 is a block diagram illustrating the processing of the register component of the dynamic address system.

FIG. 4 is a block diagram illustrating the processing of the register component of the dynamic address system. The component is passed a dynamic address name (e.g., a numeric identifier) and password and stores the name and password in the registration table. In block 401, the component retrieves the passed dynamic address name. In decision block 402, if the retrieved dynamic address name is already registered as indicated by an entry in the registration table, then the component sends an error message in block 403 and completes, else the component continues at block 404. In block 404, the component adds an entry to the registration table that includes the dynamic address name and password. In block 405, the component sends an indication of success and then completes.

Figure 5:
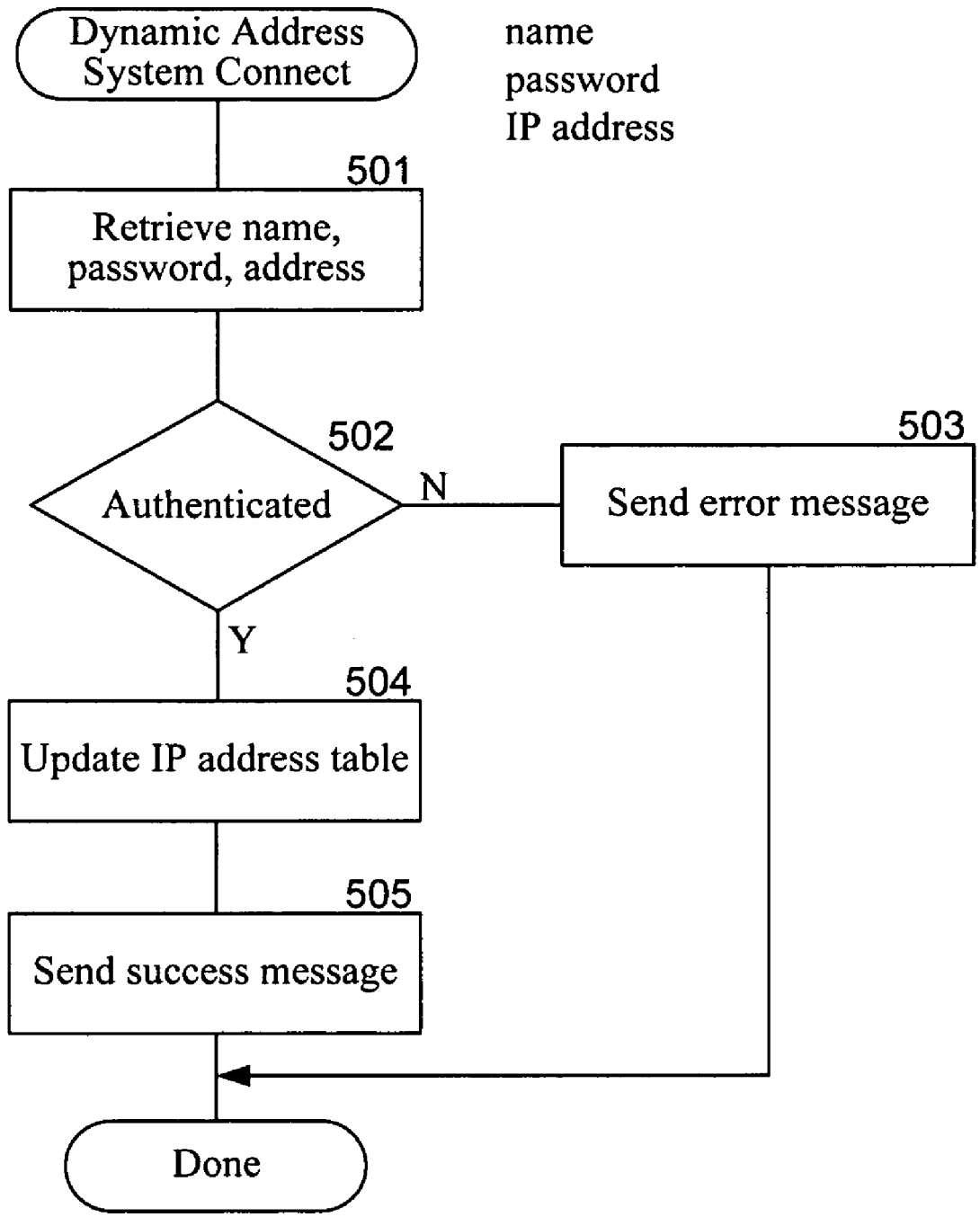
FIG. 5 is a flow diagram illustrating the processing of the connect component of the dynamic address system in one embodiment.

FIG. 5 is a flow diagram illustrating the processing of the connect component of the dynamic address system in one embodiment. The component is passed a dynamic address name, password, and current IP address. The component authenticates the dynamic address name and password and updates the IP address table with the current IP address. In block 501, the component retrieves the passed dynamic address name, password, and current IP address. In decision block 502, if the dynamic address name and password can be authenticated based on an entry in the registration table, then the component continues at block 504, else the component sends an error message in block 503 and then completes. In block 504, the component updates the IP address table with the current IP address for the dynamic address name. In block 505, the component sends an indication of success and then completes.

Figure 6:
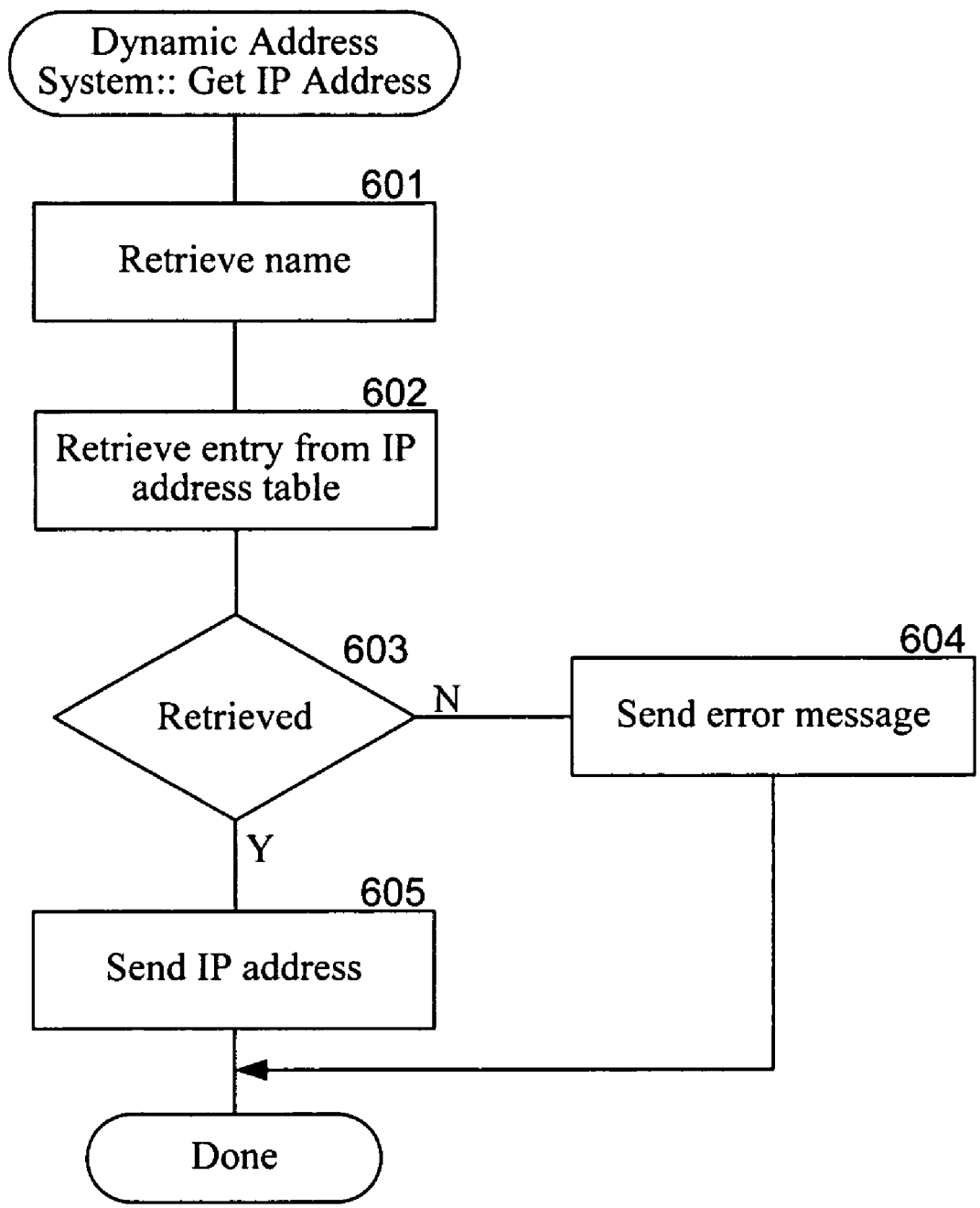
FIG. 6 is a flow diagram illustrating the processing of the get IP address component of the dynamic address system in one embodiment.

FIG. 6 is a flow diagram illustrating the processing of the get IP address component of the dynamic address system in one embodiment. The component is passed a dynamic address name and returns the associated current IP address. In block 601, the component retrieves the passed dynamic address name. In block 602, the component retrieves an entry from the IP address table for the dynamic address name. In block 603, if the entry was successfully retrieved, then the component sends the IP address from the entry in block 605, else the component sends an error message in block 604. The component then completes.

Telephone System

Figure 7:
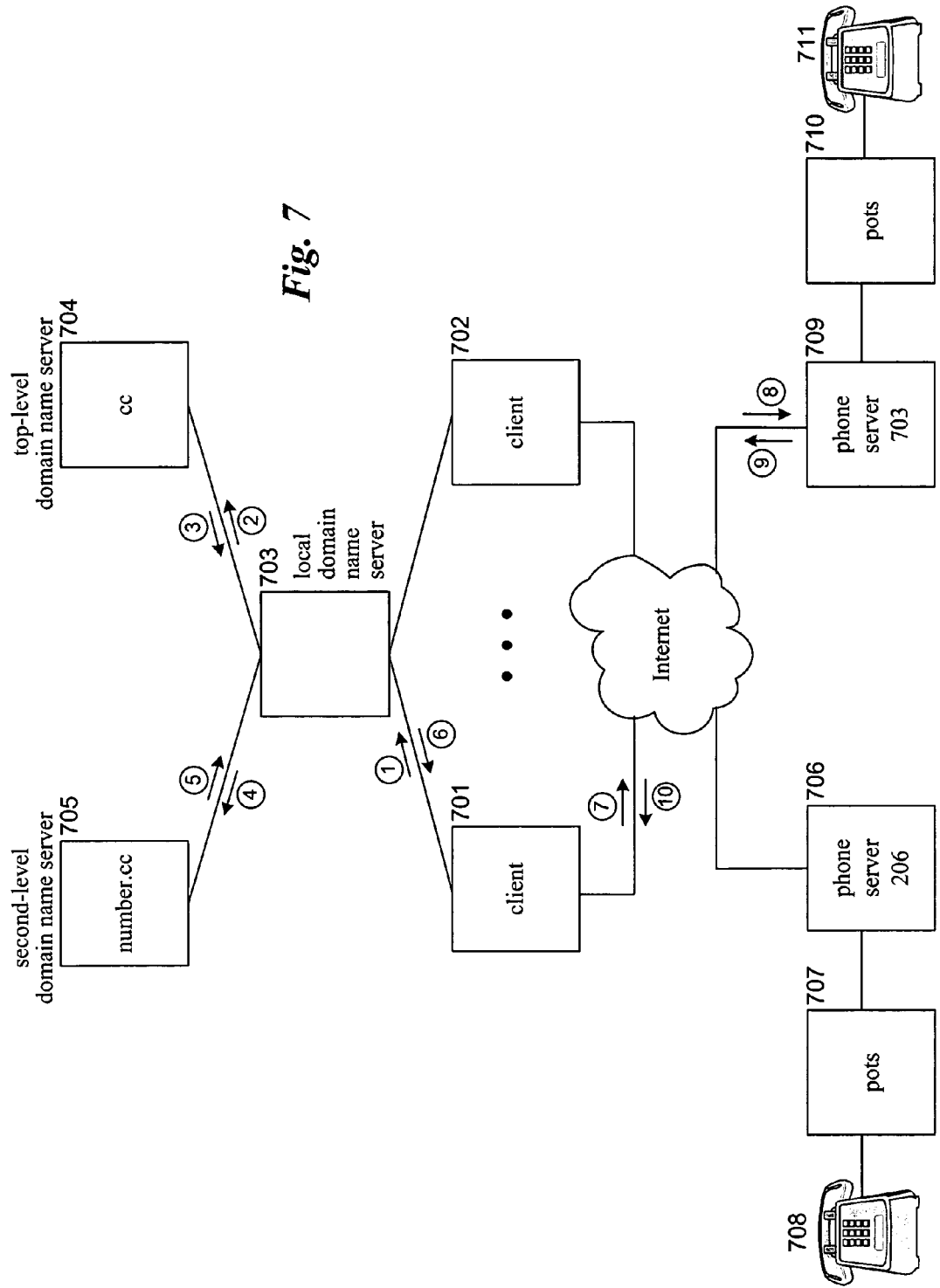
FIG. 7 is a block diagram illustrating an example flow of information of the telephone system in one embodiment.
Figure 8:
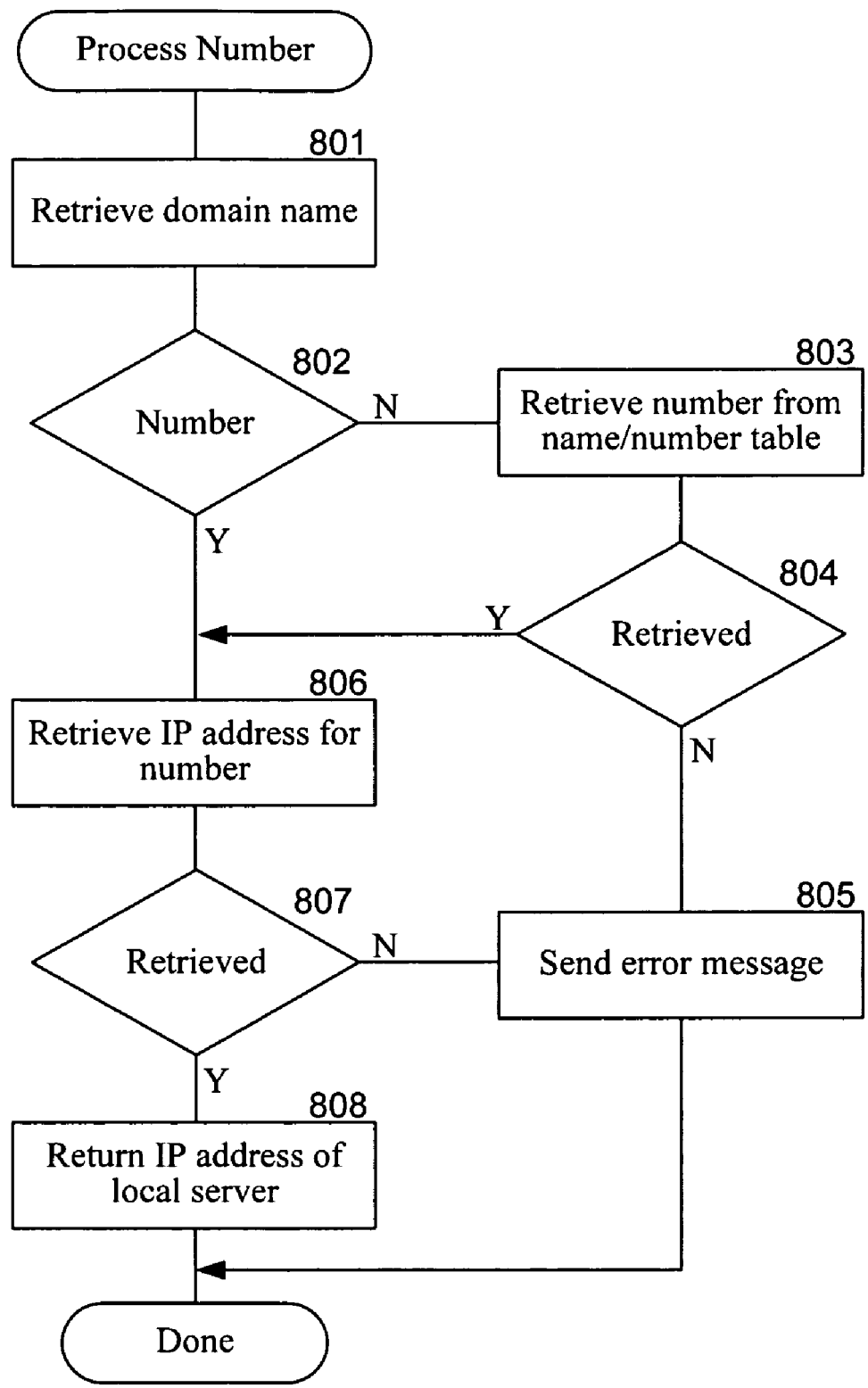
FIG. 8 is a flow diagram illustrating the processing of a process number component of a second-level domain name server in one embodiment.
Figure 9:
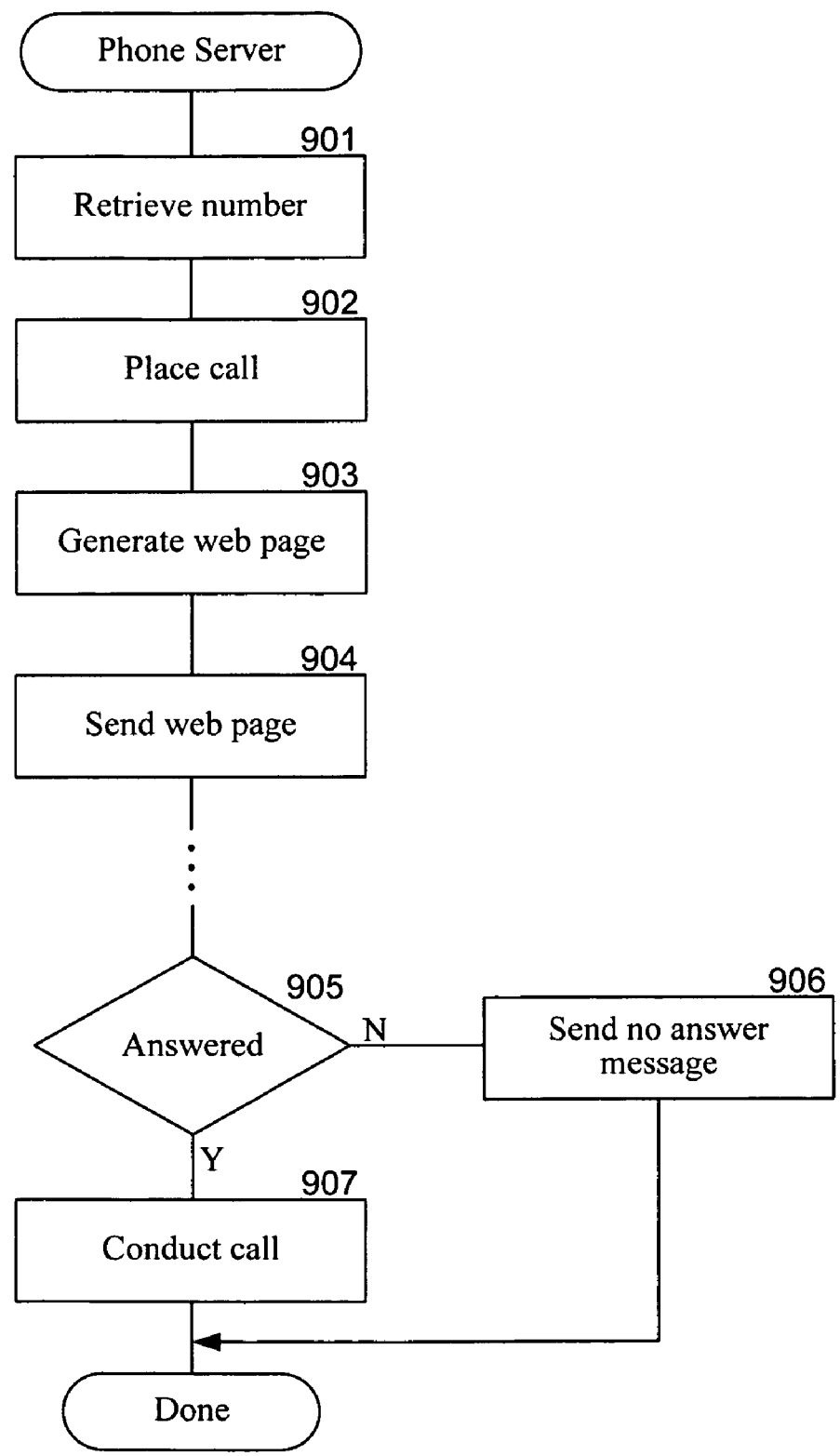
FIG. 9 is a block diagram illustrating a telephone server component in one embodiment.

FIGS. 7-9 illustrate the processing of the telephone system in one embodiment. FIG. 7 is a block diagram illustrating an example flow of information of the telephone system in one embodiment. The diagram illustrates client computers 701 and 702, a local domain name server 703, a top-level domain name server 704, a second-level domain name server 705, telephone servers 706 and 709, telephone systems 707 and 710, and telephones 708 and 711. The flow of information illustrates the placing of a phone call by a user of client computer 701 to telephone 711. The user initiates the telephone call by providing a domain name associated with a telephone number (e.g., "7035551212.cc") to a browser on client computer 701. Client computer 701 then sends a resolution request to the local domain name server 703 as indicated by arrow 1. The local domain name server 703 forwards the resolution request to the top-level domain name server 704 as indicated by arrow 2 assuming that it has cached the name of the authoritative domain name server for the "cc" domain. The top-level domain name server identifies the name of the domain name server for "xxx.cc" (where xxx is any 10 digit number) and returns the name to the local domain name server as indicated by arrow 3. The local domain name server sends a resolution request to the second-level domain name server as indicated by arrow 4. The second-level domain name server identifies a telephone server from which the telephone number should be dialed and returns the IP address of that telephone server to the local domain name server as indicated by arrow 5. The identified telephone server may be located so that the telephone call is a local call (e.g., within the 703 area code). The local domain name server forwards the IP address of the telephone server to client computer 701 as indicated by arrow 6. Client computer 701 then sends a message to telephone server 709 that is addressed by the IP address as indicated by arrows 7 and 8. Telephone server system 709 then places a local call using telephone system 710 to telephone 711. The telephone server then provides a response to client computer 701 as indicated by arrows 9 and 10. The user of client computer 701 then conduct a conversation via the Internet with a user of telephone 711.

FIG. 8 is a flow diagram illustrating the processing of a process number component of an authoritative domain name server in one embodiment. The component is passed a domain name and returns the IP address of a telephone server. In block 801, the component retrieves the domain name. In decision block 802, if the domain name includes a number (e.g., "2065551212.cc," "2.0.6.5.5.5.1.2.1.2.cc," or "206.555.1212.cc"), then the component continues at block 806, else the component continues at block 803. In block 803, the component retrieves a telephone number from a name/number table that maps users names to their corresponding telephone number. In decision block 804, if a telephone number was retrieved, then the component continues at block 806, else the component sends an error message in block 805 and then completes. In block 806, the component retrieves the IP address of the telephone server associated with the telephone number. The telephone system may maintain a mapping from each area code to telephone server that may be located within the area code. In decision block 807, if an IP address was successfully retrieved, then the component returns the IP address of the local telephone server in block 808, else the component sends an error message in block 805. The component then completes.

FIG. 9 is a block diagram illustrating a telephone server component in one embodiment. The component receives a telephone number, dials that number through a telephone system, and coordinates the conducting of the telephone call. In block 901, the component retrieves the telephone number from the domain name. In block 902, the component places a telephone call to the telephone number via the telephone system. In block 903, the component generates a web page indicating the status of the telephone call. In block 904, the component sends a web page to the client computer that initiated the telephone call. In decision block 9045, if the telephone call is answered, then the component conducts a telephone call in block 9067, else the component sends a no answer message in block 906. The component then completes.

Mapping System

Figure 10:
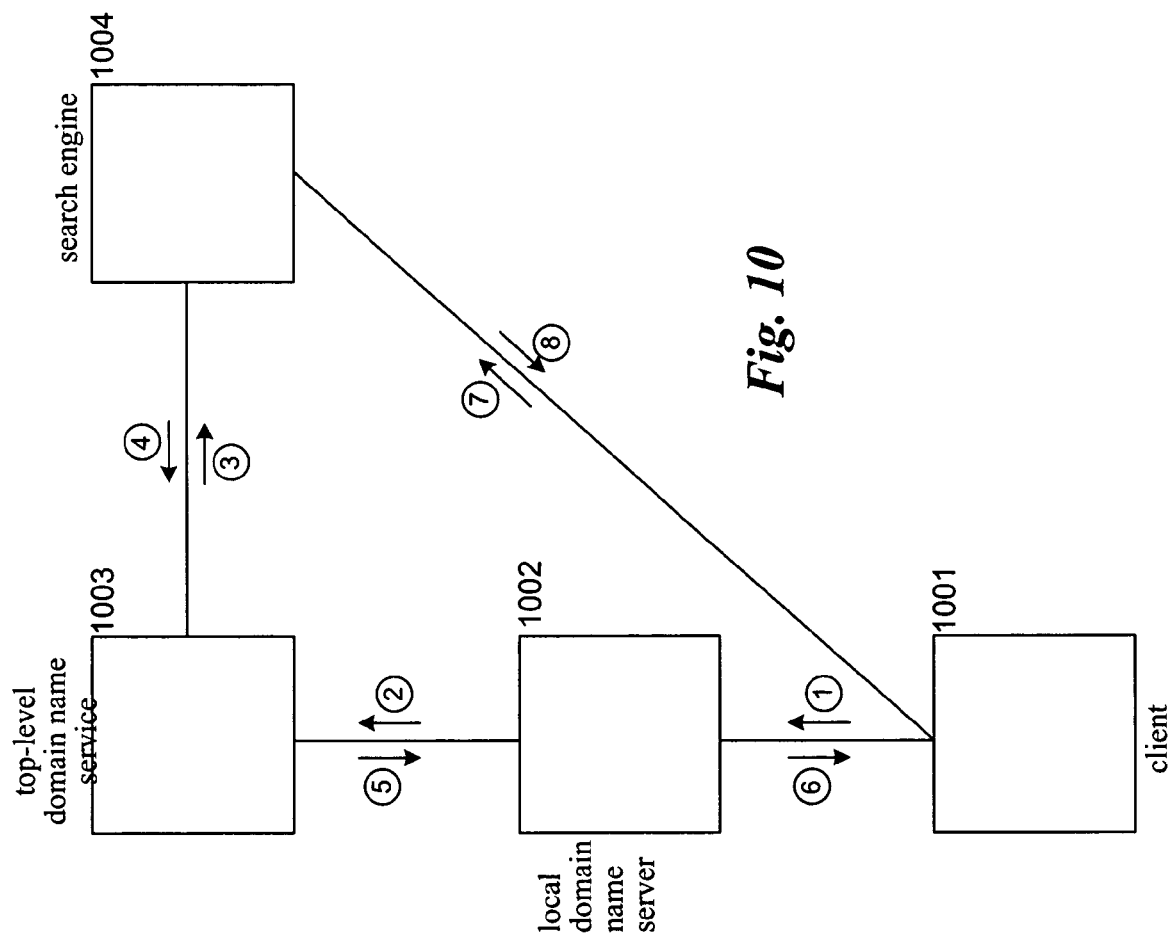
FIG. 10 is a block diagram of an example information flow of the mapping system in one embodiment.
Figure 11:
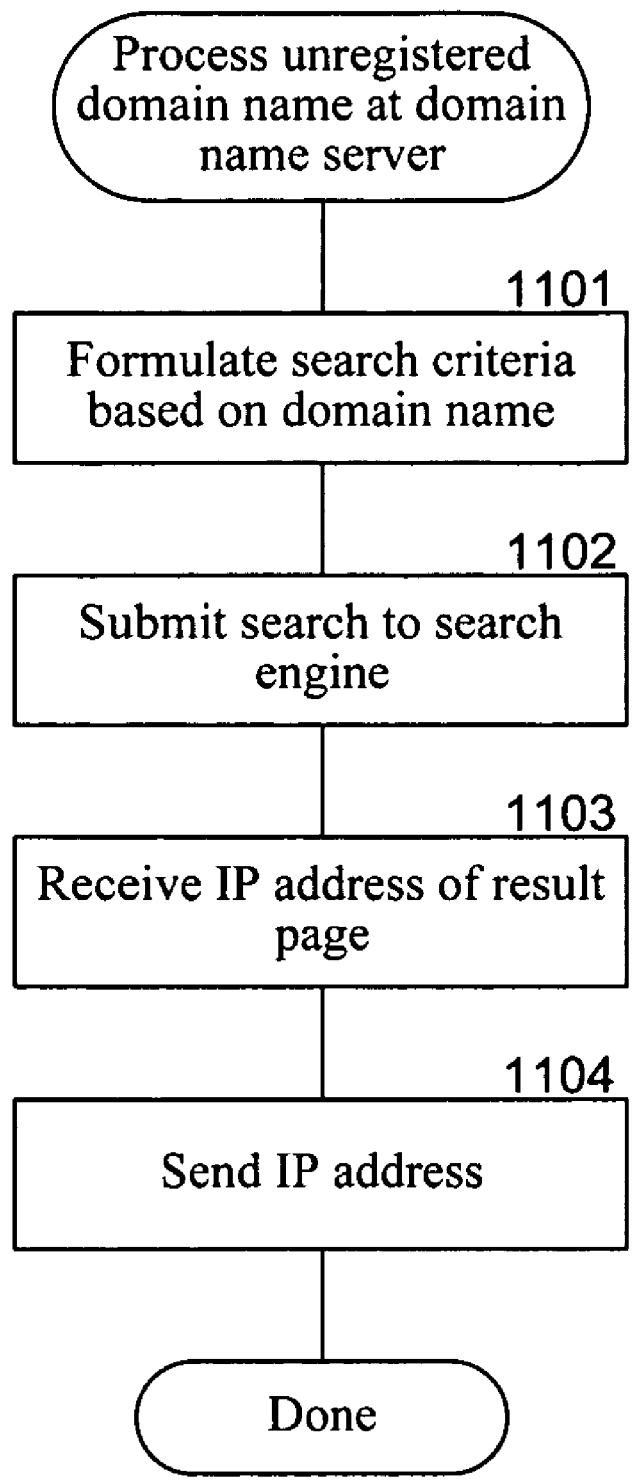
FIG. 11 is a flow diagram illustrating the processing of a process unregistered domain name at DNS component in one embodiment.
Figure 12:
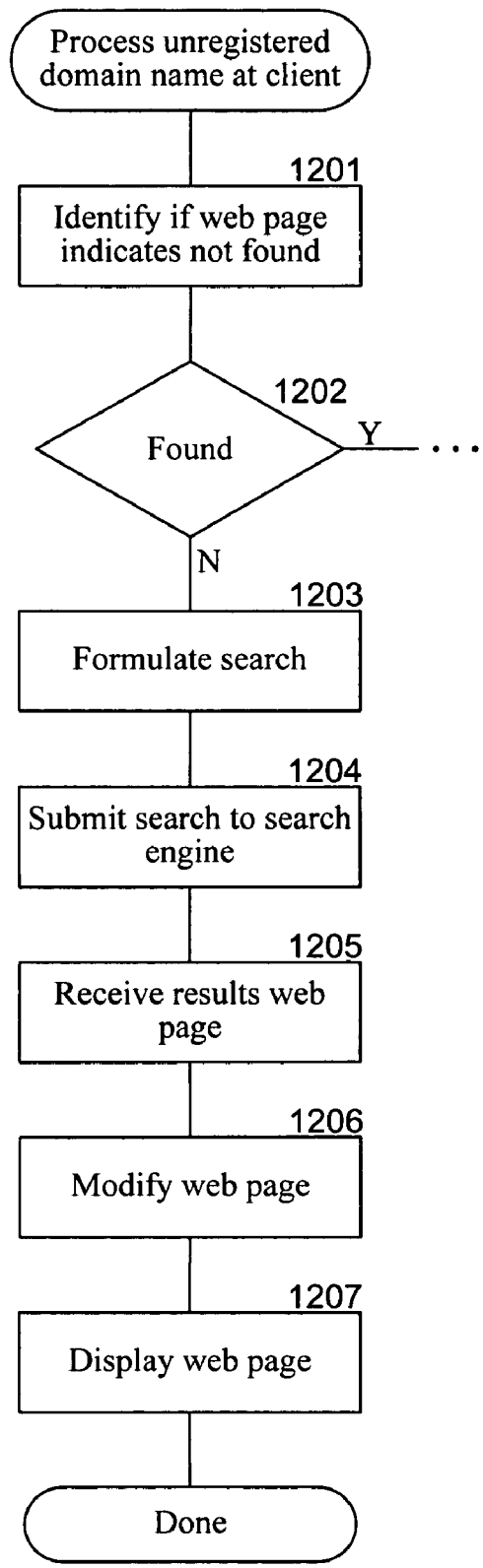
FIG. 12 is a flow diagram illustrating the processing of a process unregistered domain name at client computer component in one embodiment.

FIGS. 10-12 are diagrams illustrating the mapping system in one embodiment. FIG. 10 is a block diagram of an example information flow of the mapping system in one embodiment. The diagram illustrates a client computer 1001, a local domain name server 1002, the top-level domain name server 1003, and a search engine 1004. In this example, the client computer requests access to an unregistered domain name. The client computer initially sends a resolution request to local domain name server 1002 as indicated by arrow 1. The local domain name server 1002 forwards the resolution request to the top-level domain name server as indicated by arrow 2 assuming that the name of the top-level domain name server has been cached. The top-level domain name server may determine that the domain name is not registered. If unregistered, the top-level domain name server generates a search request based on the domain name and submits the search request to the search engine as indicated by arrow 3. The search engine performs a search and returns the IP address of a web page through which the search results can be accessed as indicated by arrow 4. The IP address is then forwarded by the top-level domain name service to the client computer via the local domain name server as indicated by arrows 5 and 6. The client computer then accesses the search results by sending a request to the search engine as indicated by arrow 7. The search engine then replies with the search results in a web page as indicated by arrow 8. The user can then select a line of the search results to visit a web site. Alternatively, the top-level domain name server need not submit the search request directly but rather return a special search engine IP address. When the search engine receives a message from a client computer at that IP address, it searches based on the domain name and returns the results in a web page.

FIG. 11 is a flow diagram illustrating the processing of a process unregistered domain name at a domain name server component in one embodiment. The component may execute on a domain name server. The component is invoked when it is determined that a domain name has no associated IP address and submits a search request and sends an IP address relating to the results. In block 1101, the component formulates the search query. For example, if the domain name is "smith.acme.com," then the search query may be "acme smith." In block 1102, the component submits the search request based on the unregistered domain name to the search engine. In block 1103, the component receives the IP address of the search results. In block 1104, the component sends a response with the IP address of the search results and then completes. Alternatively, the component may analyze the search results to identify a link to a web site that may be the web site that the user intended. In such a case, the component may identify the IP address of the link (e.g., using the DNS) and send that IP address in the response.

FIG. 12 is a flow diagram illustrating the processing of a process unregistered domain name at client computer component in one embodiment. The component may be implemented as part of a browser or as a plug-in to a browser that executes at a client computer. The component recognizes a response from the DNS that the domain name is unregistered and automatically submits a search request. In block 1201, the component identifies whether a response from a domain name server indicates that the domain name cannot be found (e.g., is unregistered). In decision block 1202, if the domain name was found, then the component continues its normal processing as indicated by the ellipsis, else the component continues at block 1203. In block 1203, the component formulates the search request based on the domain name. In block 1204, the component submits the search request to the search engine. In block 1205, the component receives the search results in a web page. In block 1206, the component may optionally modify the web page to indicate that the search results were retrieved because the domain name was not registered. In block 1207, the component displays the web page and then completes.

In one embodiment, the resolution system, telephone system, and mapping system execute on a computer system that may include a central processing unit, memory, input devices (e.g., keyboard and pointing device), output devices (e.g., display devices), and storage devices (e.g., disk drives). The memory and storage devices are computer-readable storage media that may contain computer instructions that implement the verification system. The systems may communicate with other computer systems via the Internet, a wide area network, local area network, point-to-point connections, or other communications links. The computer systems may be directly connected or indirectly connected (e.g., via proxy) to the communications links. The communications links are computer-readable storage media for transmitting data structures (e.g., messages) of the systems.

From the above description, it will be appreciated that although specific embodiments of the resolution, telephone, and mapping systems have been described for purposes of illustration, various modifications may be made without deviating from the scope of the invention. For example, one skilled in the art would appreciate that in the mapping system, a local domain server may submit search requests to a search engine when a domain name is not registered and return the IP address of the search engine to the client computer. The mapping system may also return an IP address to an advertisement web page that may be related to the unregistered domain name. For example, if the unregistered domain name is "homegrocery.com," then the IP address may refer to an advertisement server that when it receives the unregistered domain name provides an advertisement for a competitor with a link to the competitor's web site. The mapping system may also automatically redirect the client computer to the competitor's web site. The invention is defined by the claims that follow.

The invention claimed is:

1. A method in a computer system for providing dynamic network addresses for devices associated with users, the method comprising:
receiving a DNS request from a client to translate a domain name into a network address for communicating with a device, wherein the translating comprises:
determining a user identifier associated with the received domain name;
sending to a dynamic address system the determined user identifier, the dynamic address system having a mapping from user identifiers to network addresses, each user identifier associated with a user, wherein the dynamic address system periodically receives an update for each user that comprises a current network address of a device through which the user is accessible and wherein upon receiving the update, the dynamic address system associates the received current network address with the user identifier associated with the user;
receiving from the dynamic address system the current network address associated with the determined user identifier; and
sending the received current network address to the client in response to the request to translate the domain name, such that the client receives the current network address associated with the user by sending a single DNS request to the computer system.

2. The method of claim 1 wherein the dynamic address system supports instant messaging and the user identifier identifies a user of the instant messaging system.

3. The method of claim 1 wherein the device is connected to the Internet.

4. The method of claim 3 wherein the device is a web server.

5. The method of claim 1 wherein the network address is an IP address.

6. The method of claim 1 wherein the computer system is a domain name server.

7. The method of claim 6 wherein the domain name server is a top-level domain name server.

8. The method of claim 6 wherein the domain name server is a second-level domain name server.

9. The method of claim 1 wherein the sending of the received network address includes sending an indication not to cache the received network address.

10. The method of claim 1 wherein the sending of the received address including sending an indication to cache the received network address for a certain amount of time.

11. The method of claim 1 including sending to the dynamic address system authentication information along with the determined user identifier so that the dynamic address system can authenticate the computer system.

12. A domain name system for providing dynamic addresses for resources, comprising:
a process domain name component configured to receive a uniform resource identifier having a parameter that identifies a resource;
a dynamic address name table component configured to identify a dynamic address name associated with the parameter;
a dynamic address system communication component configured to send to a dynamic address system that is external to the domain name system the identified dynamic address name, the dynamic address system having a mapping from dynamic address names to network addresses wherein resources have a dynamic address name and have their network address registered with the dynamic address system and configured to receive from the dynamic address system a network address for the identified dynamic address name;
a response component configured to send the received network address as the address for the resource identified by the parameter, such that a client receives the network address associated with the resource by sending a single DNS request to the computer system; and
wherein said process domain name component, said dynamic address name table component, said dynamic address system communication component, and said response component are store on a memory.

13. The system of claim 12 wherein the resource is a device connected to the Internet.

14. The system of claim 12 wherein the domain name system is a web site.

15. The system of claim 14 wherein the uniform resource identifier is received after a domain name server directs a resolution request for an address to the domain name system.

16. The system of claim 15 wherein the domain name server is a second-level domain name server.

17. The system of claim 15 wherein the domain name server is a top-level domain name server.

18. The system of claim 12 wherein the network address is an IP address.

19. The system of claim 12 wherein the dynamic address system is an instant messaging system and the dynamic address name identifies a web site that registered its address with the instant messaging system.

20. A computer-readable storage medium containing instructions for controlling a computer system to provide dynamic addresses for devices, by a method comprising:
receiving a DNS request from a client to translate a domain name into a network address for communicating with a device, wherein the translating comprises:
determining a user identifier associated with the received domain name;
sending to a dynamic address system the determined user identifier, the dynamic address system having a mapping from user identifiers to network addresses, each user identifier associated with a user, wherein the dynamic address system periodically receives an update for each user that comprises a current network address of a device through which the user is accessible and wherein upon receiving the update, the dynamic address system associates the received current network address with the user identifier associated with the user;
receiving from the dynamic address system the current network address associated with the determined user identifier; and
sending the received current network address to the client in response to the request to translate the domain name, such that the client receives the current network address associated with the user by sending a single DNS request to the computer system.

21. The computer-readable storage medium of claim 20 wherein the dynamic address system supports instant messaging and the user identifier identifies a user of the instant messaging system.

22. The computer-readable storage medium of claim 20 wherein the device is connected to the Internet.

23. The computer-readable storage medium of claim 22 wherein the device is a web server.

24. The computer-readable storage medium of claim 20 wherein the network address is an IP address.

25. The computer-readable storage medium of claim 20 wherein the computer system is a domain name server.

26. The computer-readable storage medium of claim 25 wherein the domain name server is a top-level domain name server.

27. The computer-readable storage medium of claim 25 wherein the domain name server is a second-level domain name server.

28. The computer-readable storage medium of claim 20 wherein the sending of the received network address includes sending an indication not to cache the received network address.

29. The computer-readable storage medium of claim 20 wherein the sending of the received address including sending an indication to cache the received network address for a certain amount of time.

30. The computer-readable storage medium of claim 20 including sending to the dynamic address system authentication information along with the determined user identifier so that the dynamic address system can authenticate the computer system.

* * * * *

UNITED STATES PATENT AND TRADEMARK OFFICE
CERTIFICATE OF CORRECTION

PATENT NO. : 7,359,987 B2
APPLICATION NO. : 09/899829
DATED : April 15, 2008
INVENTOR(S) : Stahura It is certified that error appears in the above-identified patent and that said Letters Patent is hereby corrected as shown below:

In column 2, line 16, delete "signon" and insert -- sign on --, therefor.

In column 8, line 66, delete "users" and insert -- user's --, therefor.

In column 9, line 22, delete "9045," and insert -- 905, --, therefor.

In column 9, line 24, delete "9067," and insert -- 907, --, therefor.

Signed and Sealed this

Twenty-ninth Day of July, 2008

JON W. DUDAS
*Director of the United States Patent and Trademark Office*